United States Patent [19]

Camras

[11] 3,805,288

[45] Apr. 16, 1974

[54] TRANSDUCER MACHINE FOR SLIDEABLE RECEPTION OF AND AUTOMATIC ELECTRIC CIRCUIT CONNECTION WITH A HAND HELD TYPE SELF-CONTAINED TAPE RECORDER

[75] Inventor: Marvin Camras, Glencoe, Ill.

[73] Assignee: IIT Research Institute, Chicago, Ill.

[22] Filed: June 1, 1972

[21] Appl. No.: 258,750

Related U.S. Application Data

[62] Division of Ser. No. 831,352, June 9, 1969, Pat. No. 3,686,433.

[52] U.S. Cl. .............................360/91, 360/94
[51] Int. Cl. .......................................... G11b 31/00
[58] Field of Search.... 179/100.2 Z, 100.12, 100.11

[56] References Cited

UNITED STATES PATENTS 3,531,127 9/1970 Harper ........................ 179/100.2 Z
2,280,465 4/1942 Barrett et al.................. 179/100.11

*Primary Examiner*—Bernard Konick
*Assistant Examiner*—Robert S. Tupper
*Attorney, Agent, or Firm*—Hill, Sherman, Meroni, Gross & Simpson

[57] ABSTRACT

A magnetic transducer system for selective audio or video operation with movable guides for shifting the tape path between audio, video and rewind positions, or with fixed guides defining both an audio and video tape path, the audio tape path being clear of the video head, for example. A video transducer with a receptacle removably receiving and providing external energization for a battery powered audio transducer unit.

4 Claims, 3 Drawing Figures

TRANSDUCER MACHINE FOR SLIDEABLE RECEPTION OF AND AUTOMATIC ELECTRIC CIRCUIT CONNECTION WITH A HAND HELD TYPE SELF-CONTAINED TAPE RECORDER

CROSS REFERENCE TO RELATED APPLICATIONS

The present application is a division of my pending application U.S. Ser. No. 831,352 filed June 9, 1969, (now U.S. Pat. No. 3,686,433 issued Aug. 22, 1972).

SUMMARY OF THE INVENTION

A feature resides in an alternating current energized transducer machine wherein a battery powered audio unit is detachably connected with the transducer machine to receive external power therefrom and/or to utilize the power amplifier and loudspeaker of the transducer machine.

Other objects, features and advantages of the invention will be readily apparent from the following description of certain preferred embodiments thereof, taken in conjunction with the accompanying sheet of drawings, although variations and modifications may be effected without departing from the spirit and scope of the novel concepts of the disclosure.

DESCRIPTION OF THE PREFERRED EMBODIMENTS

Figure 1:
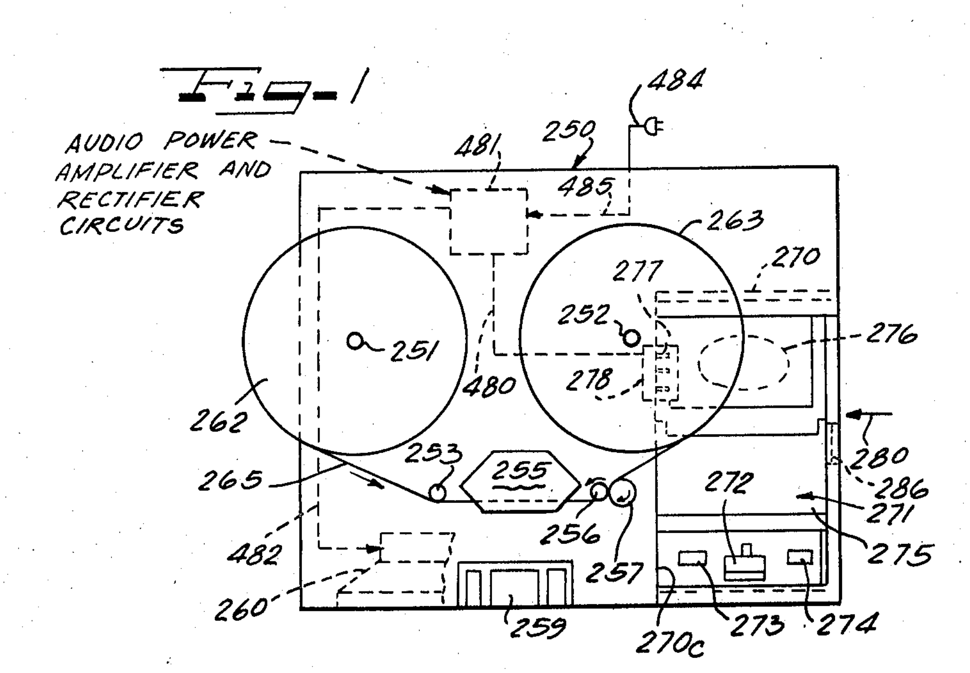
FIG. 1 is a somewhat diagrammatic plan view showing a video transducing device with a receptacle for removably receiving an audio transducing unit.
Figure 2:
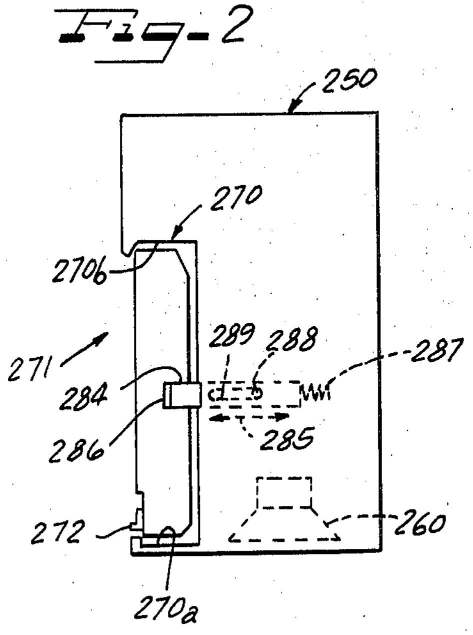
FIG. 2 is a somewhat diagrammatic end elevational view of the device of FIG. 1 and illustrating certain details of the audio transducer receptacle.

The disclosure of the present invention set forth hereinafter is based on the disclosure with respect to the seventh and eighth figures of my U.S. Pat. No. 3,686,433, issued Aug. 22, 1972. FIGS. 1 and 2 herein correspond to such seventh and eighth figures.

Referring to FIGS. 1 and 2, there is indicated a reel to reel tape transducer machine 250 having a supply spindle 251, a takeup spindle 252, a tape guide 253, a video transducer head arrangement 255, a capstan drive element 256, a capstan pressure roller 257, and a push button control arrangement 259. The tape transport mechanism of the transducer machine 250 may be identical to that illustrated in the tenth figure of my U.S. Pat. No. 3,596,008 issued July 27, 1971.

The drive for the capstan drive element 256 may correspond to the drive arrangement of the eighth or 12th figures of my U.S. Pat. No. 3,449,528 issued June 10, 1969, and by way of example FIG. 3 corresponds to such twelfth figure of U.S. Pat. No. 3,449,528. Thus the electronic circuitry with respect to the transducer head of the transducer machine 250 may be as shown in FIG. 3, for example, with an audio circuit 192 connecting with the relatively large high quality loudspeaker diagrammatically indicated at 260 in FIGS. 1 and 2.

Figure 3:
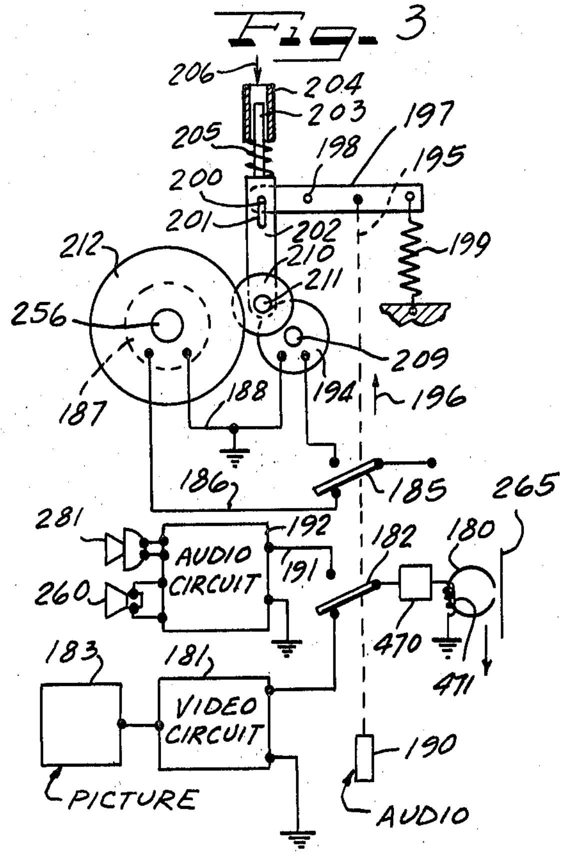
FIG. 3 is a top plan view showing an audio/video transducer mechanism and corresponds to the 12th figure of U.S. Pat. No. 3,449,528.

Referring to FIG. 3 there is shown a two speed tape transport which can be used to move tape 265 at a relatively high speed during recording or playback of video intelligence, and which can be used to move the tape at a relatively low speed during recording and playback of audio intelligence. During high speed operation of the system, transducer head unit 180 of head assembly 255 is connected to a video circuit 181 by a selector switch 182. The video circuit 181 is connected to a picture reproducing device 183 for receiving video intelligence during record operation, and for delivering video intelligence during playback operation. A switch 185 delivers power through a line 186 to one terminal of a high speed capstan motor 187. The other terminal of the capstan motor 187 is grounded to a line 188.

To place the system of FIG. 3 in operation for recording and/or playback of audio intelligence, a button 190 is manually actuated thereby shifting the position of the switches 182 and 185. The switch 182 will then make contact with a line 191 which is connected to an audio circuit 192. Similarly, the switch 185 now makes contact with a low speed drive motor 194 to energize the motor. The button 190 is also connected to a rod indicated at 195 and is moved therewith. As the rod 195 is moved in the direction indicated by the arrow 196, a pivotally mounted lever 197 will pivot about a pin 198 in a counterclockwise direction against the force of a tension spring 199. This will cause a pin 200, which is secured to the lever 197, to move within an elongated slot 201 on a rod 202. The rod 202 has a reduced portion 203 which is slideably carried within a housing 204 and guided thereby. A compression spring 205 will thus move the rod 202 in the direction indicated by arrow 206 and cause a friction feed idler wheel portion 210 to engage drive shaft 209, and to cause a reduced diameter idler wheel portion 211 to engage the flywheel 212. When the system of FIG. 3 is placed in operation for recording or playback of video intelligence, the audio button 190 is unlatched to allow return of rod 195 to its initial position. The pin 200 will move to the end of the slot 201 and then retract the idler wheel 210 from engagement with the cooperating parts. The capstan motor 187 is provided with suitable reversing means for reversing the direction of the record medium during the scanning of successive channels thereon during video operation.

In FIGS. 1 and 2 a supply reel is indicated at 262 and a tape take up reel at 263, with a length of the tape 265 threaded along the common path which is applicable both during audio and video transducing operation in accordance with the teachings of the prior U.S. Pat. No. 3,449,528.

The machine 250 is provided with a receptacle or receiving means 270 for receiving a commercially available battery powered cassette type tape record/reproducer unit such as indicated at 271. This unit includes a manual control button 272, a record safety button 273 and a battery condition indicator 274. Further, the unit 271 includes a pivotal cover 275 which may be opened to load and remove the cassette type two reel cartridge. This type of unit also includes a relatively small loudspeaker as indicated at 276, and socket means such as indicated at 277 so that the unit can be connected with an external loudspeaker and external power and the like. The transducer device 250 is provided with corresponding plug means or plug-type electric circuit connector as indicated at 278 which automatically engages into the socket means 277 as the transducer unit 271 is loaded in the direction of arrow 280 into the receptacle 270. Thus, when the unit 271 is in operative position within the receptacle 270, the transducer head of the unit 271 is automatically connected with the audio power circuit 192 of FIG. 3 and loudspeaker 260, FIGS. 1 and 2, during play mode, and is automatically connected to receive proper signal current from an external microphone 281, FIG. 3, via the audio circuit 192 of FIG. 3 during recording mode. Alternatively the recording electronics of 271 may be used, preferably powered from the main unit 250. A finger operated latch is indicated at 284 which is reciprocal in the direction of arrow 285 in response to manual pressure on the finger piece 286 and in response to pressure by means of the compression spring 287 which urges the latch to the retaining position shown in FIG. 8. The movement of the member 284 is limited by means of a fixed pin 288 riding in a slot 289 of the member. Any comparable automatic latching, and manually operated release means may be provided for releasibly retaining the unit 271 within the receptacle 270.

In FIGS. 1 and 2, by way of example, the loudspeaker 260 is indicated as being selectively connected with audio unit 271 via socket 277, plug 278, cable 480, audio power amplifier and rectifier circuits component 481, and conductors 482. Power is shown as being supplied to the audio unit from conventional power cord 484 via conductors 485, the rectifier stages of component 481 and separate conductors of cable 480.

Thus, the transducer system of the present invention comprises a record medium transducing machine 250 including a transport mechanism integral therewith for the transducing of audio and video signals, the receptacle 270 having end walls such as indicated at 270*a* and 270*b* defining front and rear boundaries of the receptacle and a lateral wall 270*c* defining a side boundary of the receptacle. The generally rectangular recorder unit receiving space of the receptacle is disposed entirely clear of the transport mechanism of the transducer machine 250 and is spaced a substantial distance from the transducer head assembly 255. As seen in FIG. 2, the receptacle has a substantially unobstructed side opposite the lateral wall 270*c* of a configuration to accommodate slidable insertion into the receptacle of the self-contained battery powered portable tape recorder unit 271. The unit 271 has a length substantially equal to the distance between the end walls 270*a* and 270*b* of the receptacle and has a width generally corresponding to the width of the receptacle.

Thus the self-contained battery powered audio transducer unit 271 has a size substantially equal to the size of the receptacle 270 and is of a length dimension for interengagement with the guide channel defined by the end walls 270*a* and 270*b* during movement of the unit 271 along the loading path in a direction at right angles to the lateral boundary of the receptacle defined by the lateral wall 270*c*. As previously explained, the unit 271 includes a relatively small loudspeaker 276 and has a socket means 277 so that the unit can be connected with an external loudspeaker and external power and the like. Thus, the plug means 278 simulates the conventional plug type connector which is conventionally used for coupling with the socket 277, such "patch cords" being well known in the art.

As is well known, the unit 271 is operable to transduce records therein when removed from the receptacle 270 without any connection to the transport mechanism and is of a size and weight to be held in the hand during such transducing operations.

The loudspeaker 260 is of a relatively large size in comparison to the size of a speaker such as indicated at 276 suitable to a tape recorder of a size to fit in the receptacle 270.

One commercially available portable tape recorder of the type shown in FIGS. 1 and 2 is stated in its operating manual to weigh only 3 pounds (including batteries). Power for this unit is completely self-contained. The manual states that a patch cord (included with the unit) enables playback through an external amplifying system. A 2-½ inch speaker is built into the unit. According to the manual, for playback through external amplifier a pin plug of the patch cord is connected with the external amplifying system and a 3-pole plug at the other end of the cable is connected to socket 1 of the unit. The volume control of the unit is set at zero, and volume and tone are adjusted through the controls of the amplifier. The same manual describes an "AC Adaptor" which permits operation of the unit through ordinary 110-volt house outlet. When the AC adaptor is plugged in and the recorder is not in use, the AC adaptor rejuvenates the batteries of the unit. The AC adaptor plugs into socket 2 of the unit.

A description of the unit just referred to, including a circuit diagram, is found in *Photofact Tape Recorder Series*, Volume 29, First Edition (second printing October, 1968) at pages 64 through 74. From page 64 of this description, it is seen that sockets 1 and 2 are located generally as indicated at 277, FIG. 1, so that plugs for an external amplifier and a rectifier circuit can automatically interconnect therewith as herein described. From the circuit diagram it is seen that terminals No. 3 and 5 of socket No. 1 connect with the audio output of the unit prior to the playback level control, so that the speaker of the unit such as indicated at 276 can be inactivated by means of a zero setting of the level control during playback via socket No. 1. Similarly the circuit diagram shows that a switch associated with socket No. 2 disconnects the positive terminal of the battery from terminals 1 and 2 of socket No. 2 when a plug is inserted. Thus a charging potential for the battery may be supplied between terminals No. 3 and No. 5 of socket No. 2, and an operating direct current potential from an AC adaptor or alternating current energized rectifier circuit such as that forming part of component 481, FIG. 1, may be supplied between terminals No. 1 & No. 3 of such unit.

The transducing mechanism in the illustrated embodiment includes spindles 251 and 252, reels 262 and 263, tape guide 253, head assembly 255 and drive elements 256 and 257, and tape 265 extending along the tape path between reels 262 and 263. Such transducing mechanism during an audio transducing operation, for example, supplies an audio signal from transducer head unit 180, FIG. 3, of head assembly 255 to speaker 260 via switch 182 (in upper position), line 191 and audio circuit 192. Such transducing mechanism of the transducer machine 250 is completely separate and distinct from the receiving region 270 and is completely separate and distinct from the transducer head, record medium, record medium path and record medium transport system of the portable tape recorder unit 271.

As shown in FIGS. 1 and 2, the transducer machine 250 has means such as walls 270*a* and 270*b*, FIG. 2, and 270*c*, FIG. 1, defining the receiving region 270 of generally rectangular configuration. The receiving region 270 is located integrally within the confines of the transducer machine, but is disposed entirely clear of and independent of said transducing mechanism of the transducer machine 250. The receiving region 270 has a substantially unobstructed access thereto (when latch 284 is depressed by means of finger piece 286) to accommodate insertion of portable unit 271 into the receiving region 270 as indicated by arrow 280, FIG. 1, (and to accommodate removal of the portable unit 271 from the receiving region in the direction opposite to arrow 280). The transducer machine 250 in the illustrated embodiment is provided with electric circuit connector means 278 which automatically engages into electric circuit connector means 277 of the portable unit 271 as the portable unit is loaded in the direction of arrow 280 into receiving region 270.

I claim as my invention:

1. A transducer system comprising a. an alternating current energized transducer machine including a transducing mechanism for supplying audio signals during a transducing operation, and including an audio power amplifier and a loudspeaker for producing a sound reproduction of the audio signals, b. said transducer machine having means for defining a receiving region of generally rectangular configuration located integrally within the confines of said transducer machine but disposed entirely clear of and independent of said transducing mechanism, said receiving region having a substantially unobstructed access thereto to accommodate insertion into and removal from said receiving region of a complete self-contained battery powered portable tape recorder with its own record medium, record medium path, transducer head and record medium transport system entirely independent of said transducing mechanism of said transducer machine, c. said transducer machine having electric circuit connector means mounted at said receiving region for automatic interengagement with a cooperating electric circuit connector means of the self-contained battery powered portable tape recorder, d. said transducer machine receiving region defining means providing guidance for a self-contained battery powered portable tape recorder after entry of the portable tape recorder into said receiving region through said substantially unobstructed access thereto so as to locate the same for automatic interconnection with said electric circuit connector means of said transducer machine, and e. said transducer machine having its power amplifier and loudspeaker connected in an electric circuit with said electric circuit connector means thereof for connection with the transducer head of the self-contained battery powered portable tape recorder via said electric circuit connector means thereof, said loudspeaker of said transducer machine being of relatively large size in comparison to the size of a speaker suitable to a tape recorder of a size to fit in said receiving region, f. said transducer machine having alternating current energized means including a rectifier circuit and a power cord, and said rectifier circuit being connected with the electric circuit connector means of the transducer machine for supplying power to a portable tape recorder located in said receiving region via the interconnection between the electric circuit connector means of the transducer machine and the electric circuit connector means of such portable tape recorder, and g. said transducing mechanism of said alternating current energized transducer machine being operable entirely independently of a portable tape recorder at said receiving region to produce audio signals during a transducing operation thereof, such transducing mechanism being completely separate and distinct from said receiving region and being completely separate from the electric circuit of the electric circuit connector means which connects the transducer head of portable tape recorder with the loudspeaker of the transducer machine, while being connectable with said loudspeaker of said transducer machine during said transducing operation for transducing of said audio signals into a sound field, and such transducing mechanism being completely separate and distinct from the transducer head, record medium, record medium path, and record medium transport system of a portable tape recorder in said receiving region.

2. A transducer system in accordance with claim 1 with a complete self-contained battery powered portable tape recorder located in said receiving region with its record medium, record medium path, transducer head and record medium transport system being completely separate and distinct from and independent of the transducing mechanism of said alternating current energized transducer machine and having electric circuit connector means receiving said electric circuit connector means of said alternating current energized transducer machine in electrically interconnected relationship therewith and having said transducer head thereof electrically connected with said power amplifier and said loudspeaker of said transducer machine via said electric circuit of said electric circuit connector means, said battery powered portable tape recorder having length and width dimensions substantially corresponding to the length and width dimensions of said receiving region and being operable when removed from said receiving region to transduce records therein without any connection to said transducer machine, and being of a size and weight to be held in the hand during such transducing operation while completely separate and distinct from said transducer machine.

3. A transducer system comprising a. a record medium transducer machine having a record medium transducing head assembly mounted thereon for scanning cooperation with a magnetic record medium, having a record medium transport integral therewith for moving the record medium along a record medium path past the transducing head assembly at a transducing speed during a transducing operation, and having an audio power amplifier and a loudspeaker, b. said transducer machine having opposite end walls and a lateral wall connecting said opposite end walls at one side thereof for defining respectively front and rear boundaries and a side boundary of a receiving region of generally rectangular configuration and disposed entirely clear of and independent of said transport mechanism and spaced a substantial distance and independent of said head assembly, said receiving region having a substantially unobstructed side opposite said lateral wall and of a configuration to accommodate slideable insertion into said receiving region of a complete self-contained battery powered portable tape recorder with its own record medium, record medium path, transducer head and record medium transport system entirely independent of said transducer machine, the distance between said opposite end walls substantially corresponding to the length dimension of said portable tape recorder and the width of said receiving region generally corresponding to the width of said portable tape recorder, c. said transducer machine having plug-type electric circuit connector means mounted at said lateral wall thereof and projecting into said receiving region at right angles to the plane of the side boundary of the receiving region and at a position for automatic interengagement with a cooperating socket means of the self-contained battery powered portable tape recorder, d. said transducer machine end walls defining a guide channel for guiding the self-contained battery powered portable tape recorder toward said lateral wall along a path at right angles to the side boundary of the receiving region after entry of the portable tape recorder into said receiving region through said unobstructed side thereof and said end walls preventing any substantial twisting and endwise shifting of such portable tape recorder as it is moved into the receiving region for automatic interconnection with said plug type electric circuit connector means, and e. said transducer machine having its power amplifier and loudspeaker connected in an electric circuit with said plug type electric circuit connector means for connection with the transducer head of the self-contained battery powered portable tape recorder via said socket means thereof, said loudspeaker of said transducer machine being of relatively large size in comparison to the size of a speaker suitable to a tape recorder of a size to fit in said receiving region.

4. A transducer system in accordance with claim 3 with a complete self-contained battery powered portable tape recorder located in said receiving region with its record medium, record medium path, transducer head and record medium transport system being entirely separate from and independent of said transducer machine and having socket means receiving said plug-type electric circuit connector means in plugged-in relationship thereto and having a transducer head thereof electrically connected with said power amplifier and said loudspeaker of said transducer machine via said socket means and said plug-type electric circuit connector means, said battery powered portable tape recorder having a length dimension substantially corresponding to the distance between said opposite end walls of said transducer machine, having a width generally corresponding to the width of said receiving region and being operable when removed from said receiving region to transduce records therein without any connection to said transducer machine, and being of a size and weight to be held in the hand during such transducing operation while separate from said transducer machine.

* * * * *